United States Patent

Roberts et al.

[11] 4,129,095
[45] Dec. 12, 1978

[54] SELF-AERATING CONTAINER

[76] Inventors: Thomas G. Roberts, 2815 Bentley, Huntsville, Ala. 35801; Charles M. Rust, 6511 Sheri Dr., Huntsville, Ala. 35806; Norman M. Witriol, 2501 Lancelot Dr., Huntsville, Ala. 35803

[21] Appl. No.: 752,785

[22] Filed: Dec. 20, 1976

[51] Int. Cl.² .................... A01K 63/00; A01K 97/04
[52] U.S. Cl. ............................................. 119/5; 43/57
[58] Field of Search ................................ 43/57; 119/5

[56] References Cited

U.S. PATENT DOCUMENTS

| | | | |
|---|---|---|---|
| 750,143 | 1/1904 | Wilson et al. | 43/57 |
| 754,317 | 3/1904 | Kaltenegger et al. | 119/5 |
| 1,604,971 | 11/1926 | Churchill | 43/57 |
| 3,972,145 | 8/1976 | Key | 43/57 |

FOREIGN PATENT DOCUMENTS 488785 12/1952 Canada ......................................... 43/57

Primary Examiner—Hugh R. Chamblee
Attorney, Agent, or Firm—C. A. Phillips

[57] ABSTRACT

A simple self-aerating container for small marine life which requires no power. The aeration rate is easily adjusted continuously and remains constant once set. At low flow rates, the container can be aerated over night, and the high flow rates can be used when there are a larger number of small marine life in the container, or when it is desirable to have them very active. The aerator consists of a tank with a hand pump, a simple pressure regulator, and a unique mass (air) flow regulator. The tank is also equipped with a spring loaded safety valve and a valve for filling the tank at a service station.

6 Claims, 6 Drawing Figures

U.S. Patent    Dec. 12, 1978    4,129,095

SELF-AERATING CONTAINER

BACKGROUND OF THE INVENTION

At the present time, containers for small marine life generally consist of a container within a container. The inner container has holes in it so that it can be moved up and down from time to time to help aerate the water. These buckets work fairly well with some fresh water minnows keeping them alive for a short time. However, they do not work well for some other specimens. In some cases, small aquarium pumps are used to aerate the water for shrimp when electric power is available at 110 volts. It may also be possible to buy small aquarium pumps which operate off of 6 volt or 12 volt batteries, but if so, they are expensive and hard to find.

In the device disclosed here, no electrical power is required, and the container may be carried anywhere it is desirable to use the marine life. Moreover, all forms of small marine specimens may be kept alive, including shrimp over long periods of time (days) without constant attention. Thus this present invention overcomes the disadvantages of the prior known containers.

SUMMARY OF THE INVENTION

The apparatus of the present invention includes an air reservoir, a simple pressure regulator, a unique mass flow regulator, a wire screen bubbler, a spring loaded safety valve, a filling valve, and a hand (or foot) pump. These components are arranged so that the mass flow rate of air through the aerator is adjusted by fingertip control to set the aeration rate and the length of time before the reservoir has to be refilled with air.

DESCRIPTION OF THE PREFERRED EMBODIMENT

Figure 1:
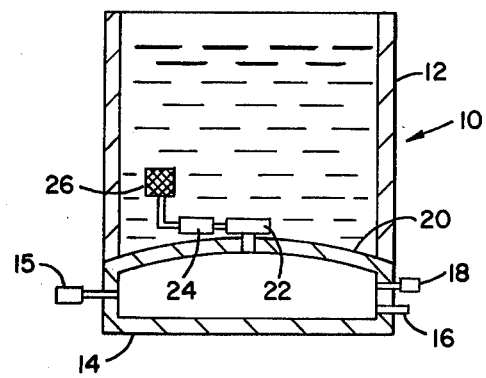
FIG. 1 is an elevational view of the apparatus of the present invention as an integral part of the container.

As seen in FIG. 1, the self-aerating container 10 for small marine biological specimens consists of a bucket 12 holding the water and the specimens. Built onto the bottom of this bucket is a reservoir 14 for holding air. This reservoir is an integral part of the bucket, and attached to this reservoir is a pump 15 (hand operated or foot operated). Also attached to this reservoir is a valve 16 such as used on tires so that the reservoir can be filled with air at any auto service station. Also attached to the outside of the reservoir is a simple spring loaded safety valve 18. The safety valve is used to keep the reservoir from being pumped to too high a pressure and to let one know when the reservoir is filled to the desired pressure. The bucket may also have clips for holding a small net to be used in retrieving the marine life. The top of the air reservoir 20 forms the bottom of the bait bucket, and the air from the reservoir leaks into the water in the bucket by passing through a pressure regulator 22 and a variable mass flow regulator 24. The mass flow can be regulated easily by turning the mass flow regulator with the fingers, and the mass flow can also be reduced to zero in the same manner. After the air passes through the mass flow regulator, it enters a small screen case 26 where the air is broken up into many small bubbles before passing through the water in the bucket.

The container is operated by filling the reservoir with air, the bucket with water. The mass flow regulator is then adjusted to the desired aeration rate. When, after several hours, the aeration rate begins to decrease, the reservoir is refilled with air by use of the attached pump.

Figure 2:
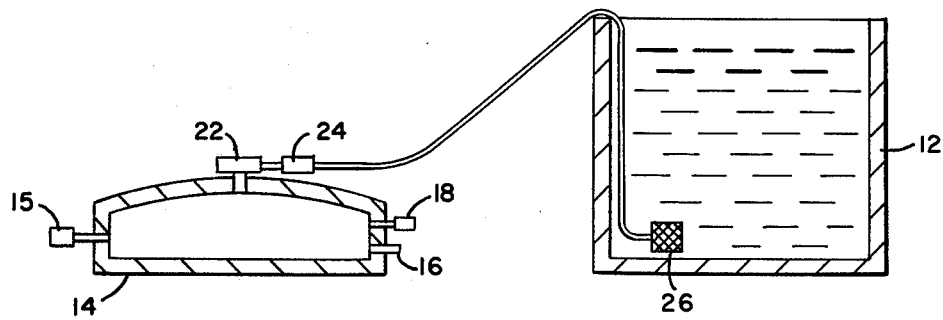
FIG. 2 is an elevational view of the apparatus of the present invention as a separate unit to be used with an auxiliary container.

FIG. 2 discloses another embodiment except that here the liquid container is not attached to the aerator and any container may be used.

Figures 3, 4:
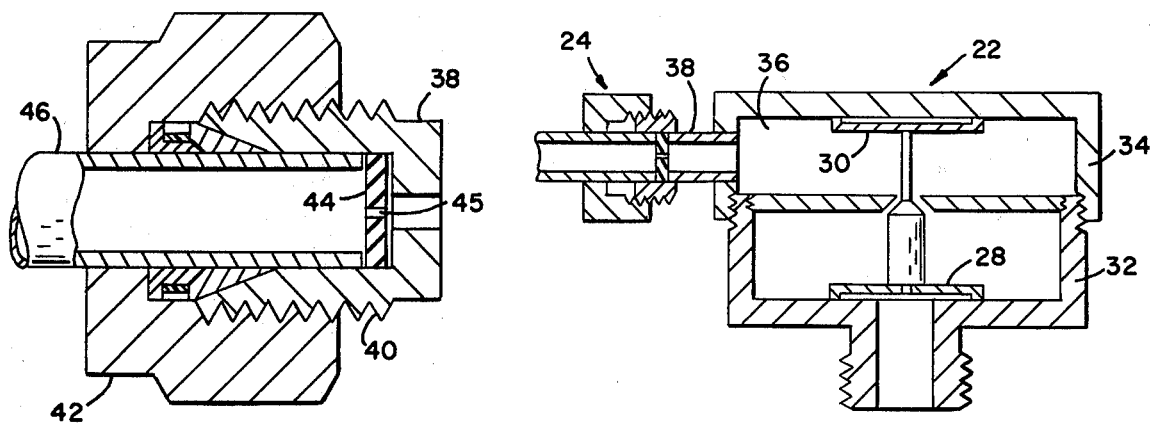
FIG. 3 is a sectional view of the pressure regulator and the mass (air) flow control valve.
FIG. 4 is an enlarged view of the mass flow regulator of FIG. 1.

The details of the mass flow regulator 24 and the pressure regulator 22 are shown in FIGS. 3 and 4. The pressure regulator 22 is of a standard type except that is has been redesigned so that the ordinary bulky springs have been replaced by flat plate-like springs 28 and 30. The bulky springs are usually used with a large diaphragm so that the output pressure may be more easily varied. But here we are not interested in varying the output pressure; therefore the regulator can be made smaller, simpler, and cheaper. The spring 28 is made weaker than the spring 30 by removing part of the material (FIG. 5) so that air can also pass through the spring 28. The lower part of housing 32 screws into the reservoir. The spring 28 is an orifice plate which screws into housing 32, and the spring plate 30 is affixed to outer housing 34. A needle like member 31 is fixed to plates 28 and 30 and includes a tapered seat portion 33 adjacent a tapered orifice 35 disposed in a plate 37 secured in the upper portion of lower housing 32. The outer housing 34 is tightened until the desired output pressure is obtained in chamber 36, by proper positioning of seats 33 and 35, and it is not again moved. The air leaves chamber 36 through outlet 38 which may be located in the top of housing 34 if desired. The aeration regulator 24 includes a threaded portion 40 disposed for threaded engagement with a female member 42. A gasket 44 such as rubber or neoprene, or the like, has a small diameter orifice 45 (or hole) and is carried in member 38 in communication with conduit 46 which extends out of member 42. The screen cage (not shown) is fastened to the other end of conduit 46. When member 42 is tightened with the fingers, the end of conduit 46 pushes on the gasket 44. This compression causes the hole in the center of 44 to close (decrease in diameter) so that the mass flow rate is decreased. Backing off of member 42 lets the gasket 44 expand so that the diameter of the hole increases and the mass flow rate of air also increases. The gasket 44 can easily be compressed to the point where the hole is completely closed and the mass flow of air stops.

Figure 5:
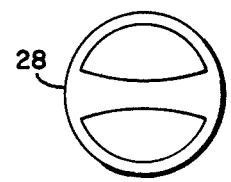
FIG. 5 is a top view of the bottom flat spring of FIG. 3.

FIG. 5 shows a top view of the spring 28 of the pressure regulator 22. The spring 30 is made similar to 28 except that it is solid and therefore stronger.

Figure 6:
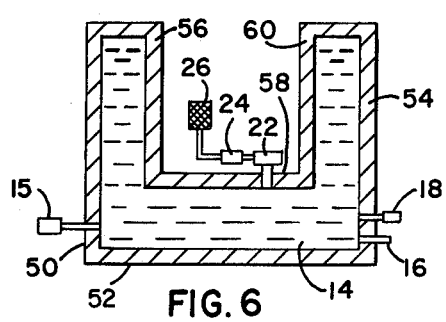
FIG. 6 is an elevational view of the apparatus of the present invention wherein an air container forms a cylindrical wall to make up the water container.

FIG. 6 illustrates a double walled cupped construction. In this embodiment, reservoir 14 is enclosed by outer walls 50, 52 and 54 and inner walls 56, 58 and 60 which forms the tank. Communicating into the reservoir is pump 15, valve 16 and safety valve 18. Communicating into the reservoir and the interior of the container is pressure regulator 22 and flow regulator 24. Screen 26 may also be attached as shown in FIG. 6.

If desired, the wire case used to produce small bubbles may be replaced with any of the devices used with aquariums for this purpose.

In water at room temperature, there are about 16.5 cm$^3$ of air dissolved in a liter of water. The dissolved air contains about 34% oxygen. Therefore it would take approximately 0.02 gm of air to resupply the air in a liter of water. In a test performed with this device, the mass flow rate was set at 0.029 gm/min which is enough to reaerate an eight liter bucket every eight minutes. With the present mass flow regulator, this flow rate could be increased or decreased by an order of magnitude by turning 42 with the fingers. If the bucket is 14 in. in diameter and the air reservoir is 10 cm high, then for a change in pressure $\Delta P = 75$ psi, there would be approximately 62 gm of air for use which is plenty to aerate a reasonably sized bucket for 12 hours or more.

We claim:

1. A self-aerating container comprising:
    (a) a tank for holding water;
    (b) a reservoir for holding air;
    (c) control means comprising:
        (1) a pressure regulator including an upper and lower housing, said lower housing having an inlet means connected to said reservoir and an upper plate secured therewith having an outlet opening therein, a first flat spring member having openings therethrough secured over said inlet, said upper housing being in threaded relation with said lower housing and having a second flat spring member secured to the inner surface thereof, and an upstanding member secured between said first and second springs and extending through said outlet opening, and
        (2) a mass flow regulator connected between an outlet opening means in said upper housing of said pressure regulator and said tank;
    (d) means carried by said reservoir for supplying air thereinto.

2. A self-aerating container as set forth in claim 1 wherein said upstanding member is provided with a tapered seat intermediate the ends thereof, said outlet opening having a tapered seat cooperating with said tapered seat of said upstanding member whereby the size of said outlet opening is adjusted.

3. A self-aerating container as set forth in claim 2 wherein said mass flow regulation means includes a first conduit secured in said outlet of said pressure regulator, said first conduit having a tapered internal surface and an inner shoulder, a second conduit extending into said first conduit, a gasket having a central opening therein disposed in abutting relation with a first end of said second conduit and said inner shoulder, and locking means carried about said second conduit in engagement with said tapered surface of said first conduit for retention of said gasket in a predetermined compressed position.

4. A self-aerating container as set forth in claim 3 including a wire mesh screen secured at a second end of said second conduit and disposed for immersion in the water.

5. A self-aerating container as set forth in claim 4 wherein said tank and said reservoir are integral, the upper wall of said reservoir serving as the lower wall for said tank.

6. A self-aerating container as set forth in claim 4 wherein said reservoir includes a lower cylindrical portion and an upper double-walled cupped portion, the inner wall of said double walled cupped portion defining said tank.

* * * * *